United States Patent
Lee et al.

(10) Patent No.: US 9,898,022 B2
(45) Date of Patent: Feb. 20, 2018

(54) POWER SHARING DEVICE AND METHOD THEREOF

(71) Applicant: ACCTON TECHNOLOGY CORPORATION, Hsinchu (TW)

(72) Inventors: Yu-Yun Lee, Hsinchu (TW); Jung-Hui Wei, Hsinchu (TW); Yi-Da Fan, Hsinchu (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 905 days.

(21) Appl. No.: 14/320,621

(22) Filed: Jun. 30, 2014

(65) Prior Publication Data

US 2015/0145337 A1 May 28, 2015

(30) Foreign Application Priority Data

Nov. 22, 2013 (TW) .............................. 102142667 A (51) Int. Cl.
*G05F 1/625* (2006.01)
*H02J 1/10* (2006.01)

(52) U.S. Cl.
CPC ................ *G05F 1/625* (2013.01); *H02J 1/10* (2013.01); *Y10T 307/549* (2015.04)

(58) Field of Classification Search
CPC ......... G05F 1/625; H02J 1/10; Y10T 307/549
USPC ..................................................... 307/52, 58
See application file for complete search history.

(56) References Cited

U.S. PATENT DOCUMENTS

| | | | | |
|---|---|---|---|---|
| 6,642,631 | B1 * | 11/2003 | Clavette | H02J 1/102 307/52 |
| 7,256,571 | B1 * | 8/2007 | Mimberg | G05F 1/56 323/267 |
| 7,342,383 | B1 * | 3/2008 | Song | H02M 3/1584 323/222 |
| 8,084,884 | B1 * | 12/2011 | Lakshmikanthan | H02M 3/1584 307/52 |
| 9,083,265 | B1 * | 7/2015 | Maroney | H02P 5/50 |
| 9,496,713 | B1 * | 11/2016 | Krolak | H02M 7/42 |
| 2003/0085622 | A1 * | 5/2003 | Hailey | G06F 1/263 307/52 |

(Continued)

FOREIGN PATENT DOCUMENTS

CN 101895200 A 11/2010
TW 201214936 A 4/2012

*Primary Examiner* — Thienvu Tran
*Assistant Examiner* — Brian K Baxter
(74) *Attorney, Agent, or Firm* — CKC & Partners Co., Ltd.

(57) ABSTRACT

A power sharing device and method thereof are disclosed herein. The power sharing device includes a control unit, multiple regulators and multiple feedback circuits. Each regulator includes a first input terminal, a second input terminal and an output terminal. The control unit generates multiple pulse-width modulation signals. The first input terminal receives one of multiple input voltages. The second input terminal receives one of the pulse width modulation signals. The output terminal selectively outputs an output power. Each feedback circuit is coupled between the second input terminal and the output terminal of one of the regulators. The output terminals of the regulators are coupled to a load, and the regulators selectively output the output power one at a time and in rotation according to the input voltages and duty cycles of the pulse-width modulation signals.

13 Claims, 5 Drawing Sheets

(56) References Cited

U.S. PATENT DOCUMENTS

| | | | |
|---|---|---|---|
| 2008/0136472 A1* | 6/2008 | Shor | H03F 3/345 327/156 |
| 2010/0013304 A1* | 1/2010 | Heineman | G06F 1/26 307/31 |
| 2012/0068674 A1* | 3/2012 | Yu | H02M 3/1584 323/271 |
| 2013/0057239 A1* | 3/2013 | Kalje | H02M 3/1584 323/271 |
| 2013/0187447 A1* | 7/2013 | Pyko | H02J 7/1423 307/9.1 |
| 2013/0201730 A1* | 8/2013 | Luo | H02M 3/33507 363/21.17 |
| 2014/0152240 A1* | 6/2014 | Adest | H02J 1/102 320/107 |
| 2014/0306683 A1* | 10/2014 | Ngo | H02M 3/157 323/311 |

* cited by examiner

POWER SHARING DEVICE AND METHOD THEREOF

RELATED APPLICATIONS

This application claims priority to Taiwan Application Serial Number 102142667, filed Nov. 22, 2013, which is herein incorporated by reference.

BACKGROUND

Field of Invention

The present disclosure relates to a power sharing device and method thereof. More particularly, the present disclosure relates to a time-division multiplexing power sharing device and method.

Description of Related Art

Electronic products are now indispensable for people, and a basic requirement for operation of an electronic product is the power supply. Recently, in order to ensure a more reliable power supply, a power sharing device is often used for supplying electric power.

Generally, the power sharing device is implemented by multiple regulators, a processor and a bus. The processor makes an adjustment to each regulator such that each regulator has the same output voltage, and such that each regulator outputs the same output current to the bus.

However, adjusting the output voltage of each regulator to the same voltage level requires a significant amount of time. In practice, the output voltage of each regulator cannot be adjusted to the same voltage level due to characteristic deviation of the regulators or of the other components in the power sharing device. In other words, if it is desired to adjust the output voltage at an output terminal of each regulator so as to achieve power sharing, the characteristic deviation of the regulators or of the other components must be sufficiently small, and an infinite loop should be avoided when designing an algorithm for adjusting the voltage at each output terminal so that the voltage at each output terminal can be converged. Power sharing may be achieved when such requirements are met.

However, meeting the above requirements significantly increases the cost of hardware and software. Furthermore, when the number of regulators is increased, the above requirements become more difficult to meet, and costs are further increased.

SUMMARY

Therefore, the disclosure provides a time-division multiplexing power sharing device and method to resolve the problem of the high cost of hardware and software associated with the conventional power sharing device.

According to an aspect of the disclosure, a power sharing device which is suitable for multiple input powers and a load is provided. The power sharing device includes a control unit, multiple regulators and multiple feedback circuits. Each regulator includes a first input terminal, a second input terminal and an output terminal. The control unit generates multiple pulse width modulation signals. The first input terminal receives one of the input powers. The second input terminal receives one of the pulse width modulation signals, in which a feedback voltage is formed on the second input terminal. The output terminal selectively outputs an output power. Each feedback circuit is electrically coupled between the second input terminal and the output terminal of one of the regulators. The output terminal of each regulator is electrically connected to the load, and the regulators selectively output the output power to the load one at a time and in rotation according to the input powers and a duty cycle of each pulse width modulation signal during a power supply time period.

According to another aspect of the disclosure, a power sharing method which is suitable for multiple input powers and a load is provided. The power sharing method includes providing the input powers and multiple pulse width modulation signals generated by a control unit to multiple regulators, in which the regulators receive the input powers and the pulse width modulation signals so as to generate a plurality of feedback voltages; generating a plurality of output powers respectively corresponding to the pulse width modulation signals according to the input powers by the regulators; adjusting duty cycles of the pulse width modulation signals by the control unit; and outputting the output powers one at a time and in rotation by the regulators in a power supply time period according to the adjusted duty cycles of the pulse width modulation signals.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
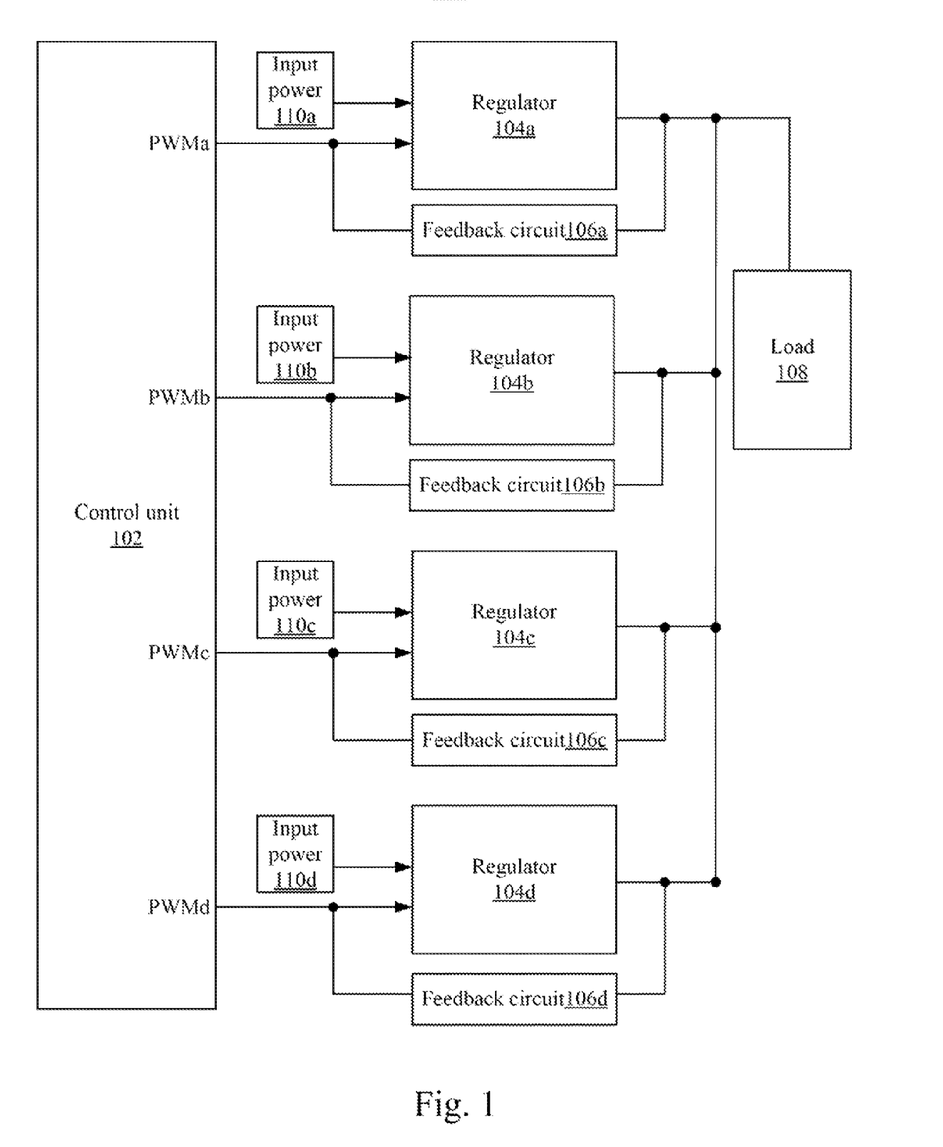
FIG. 1 is a schematic diagram illustrating a power sharing device according to one embodiment of this disclosure.

Referring to FIG. 1, a schematic diagram of a power sharing device 100 according to one embodiment of the present disclosure is illustrated. The power sharing device 100 includes a control unit 102, multiple input powers 110a-110d, multiple regulators 104a-104d, multiple feedback circuits 106a-106d and a load 108.

In some embodiments, the control unit may be a micro control unit (MCU), a central processing unit (CPU) or another control device.

In some embodiments, the regulator may be a buck regulator, a relay, a power chip or another similar device.

The control unit 102 is electrically coupled to the different regulators 104a-104d and feedback circuits 106a-106d. The regulators 104a-104d are respectively coupled to the input powers 110a-110d. The regulators 104a-104d are also coupled to the control unit 102 and the load 108.

In operation, the control unit 102 is configured to generate a plurality of pulse width modulation signals PWMa-PWMd and output the same respectively to the regulators 104a-104d. The control unit 102 further sets duty cycles of the pulse width modulation signals PWMa-PWMd, in which the duty cycles of the pulse width modulation signals PWMa-PWMd are defined as proportions of a time duration when the pulse width modulation signals PWMa-PWMd have an amplitude to a time period. As a result, the length of the duty cycles further affects the average amplitudes of the pulse width modulation signals PWMa-PWMd in the time period, i.e., the average voltages of the pulse width modulation signals PWMa-PWMd in the time period. For example, the average amplitude of a pulse width modulation signal with a 100% duty cycle is greater than the average amplitude of a pulse width modulation signal with a 50% duty cycle. In other embodiments, the amplitudes of the pulse width modulation signals may be negative or inverted, in which case the average amplitude of a pulse width modulation signal with a 100% duty cycle is smaller than the average amplitude of a pulse width modulation signal with a 50% duty cycle.

In the present embodiment, the regulators 104a-104d are configured to respectively transform the input powers 110a-110d to the corresponding output powers. For example, a regulator transforms a voltage of an input power to a voltage of an output power.

In some embodiments, the input powers 110a-110d can be the same power sources or different power sources.

In some embodiments, voltages of the input powers 110a-110d are greater than voltages of the corresponding output powers.

The feedback circuits 106a-106d are respectively coupled between output terminals through which the control unit 102 outputs the pulse width modulation signals PWMa-PWMd and output terminals through which the regulators 104a-104d output the output power.

In operation, when power is turned on, the pulse width modulation signals PWMa-PWMd generated by the control unit 102 have a first duty cycle. As mentioned above, the pulse width modulation signals PWMa-PWMd produce an average voltage in the time period according to its duty cycle. The average voltages of the pulse width modulation signals PWMa-PWMd then can be viewed as feedback voltages in the case where the pulse width modulation signals PWMa-PWMd have the first duty cycle. Subsequently, when a power supply time period starts, the control unit 102 adjusts the duty cycles of the pulse width modulation signals PWMa-PWMd to be a second duty cycle one at a time and in rotation. When any of the duty cycles is adjusted, the corresponding feedback voltage is also adjusted.

For example, the first duty cycle of the pulse width modulation signal PWMa is first adjusted to the second duty cycle which is smaller. At the same time, the average amplitude of the pulse width modulation signal PWMa is decreased. In other words, the feedback voltage corresponding to the pulse width modulation signal PWMa is decreased, and this in turn makes the regulator 104a increase the voltage of the output power so as to compensate for the pulse width modulation signal PWMa corresponding to the decreased feedback voltage. Since the voltage of the output power corresponding to the regulator 104a is higher than the voltages of the output powers corresponding to the other regulators 104b-104d, the regulator 104a dominates in outputting the output power to the load 108.

Subsequently, after a time interval, the duty cycle of the pulse width modulation signal PWMa is adjusted back to the first duty cycle, and then the duty cycles of the pulse width modulation signals PWMb-PWMd are selected in sequence to be adjusted to the second duty cycle, and this in turn makes the regulators corresponding to the second duty cycle provide the output power to the load 108 one at a time and in rotation. In this way, a stable power supply is achieved. Detailed illustration is made in the following paragraphs to explain the principle of increasing the output power by the power sharing device 100.

Figure 2A:
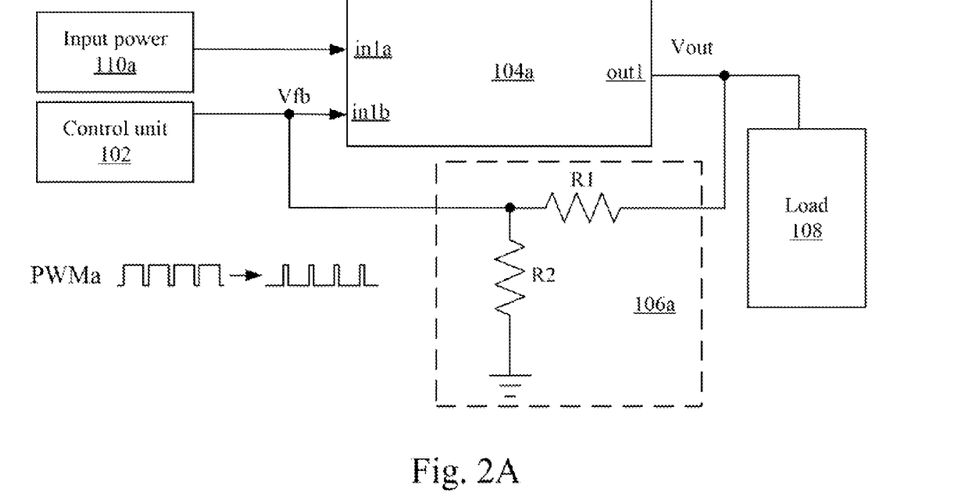
FIG. 2A is a schematic diagram illustrating a regulator and a feedback circuit in FIG. 1.

Reference is also made to FIG. 2A which is a schematic diagram illustrating the regulator 104a and the feedback circuit 106a in FIG. 1. The inner structures and connecting relationships of the other regulators 104b-104d and the feedback circuits 106b-106d can be deduced by analogy to those of the regulator 104a and the feedback circuit 106a in FIG. 2A.

As shown in FIG. 2A, the regulator 104a includes a first input terminal in1a, a second input terminal in1b and an output terminal out1. The first input terminal in1a is coupled to the input power 110a. The second input terminal in1b is coupled to the control unit 102, and the voltage on the second input terminal in1b is a feedback voltage Vfb. The output terminal out1 is coupled to the load 108.

The feedback circuit 106a includes a resistor R1 and a resistor R2. A terminal of the resistor R1 is coupled to the output terminal out1 of the regulator 104a. The other terminal of the resistor R1 is coupled to a terminal of the resistor R2 and the second input terminal in1b. The other terminal of the resistor R2 is connected to ground or coupled to a negative voltage (not shown).

In operation, the regulator 104a amplifies a reference voltage Vref (not shown) and outputs the output power having a voltage Vout at the output terminal out1, i.e., Vout=Vref*(1+R1/R2). On the other hand, since the regulator 104a maintains the feedback voltage Vfb and the reference voltage Vref to be the same voltage level when the regulator 104a operates, i.e., Vref=Vfb, when the feedback voltage Vfb and the reference voltage Vref are different, the regulator 104a makes the feedback voltage Vfb and the reference voltage Vref to be the same by adjusting the voltage Vout.

In some embodiments, the reference voltage Vref can be set by users. For example, when the resistor R1 and the resistor R2 are 2K ohms and 1K ohms respectively, the reference voltage Vref is set to be 3V if it is desired for the output voltage Vout to be 12V.

In practice, when power is turned on, the pulse width modulation signals PWMa~PWMd outputted by the control unit 102 all have the first duty cycle. Later, when a power supply time period starts, the control unit 102 adjusts the duty cycle of the pulse width modulation signal PWMa from 80% to 20%. As mentioned above, a pulse width modulation signal produces an average voltage according to its duty cycle in a time period, and the average voltage may be regarded as the feedback voltage based on a certain duty cycle.

In some embodiments, an inverter is further disposed between the control unit 102 and the regulators 104a-104d. When the power supply time period begins, the control unit adjusts the pulse width modulation signal PWMa from the first duty cycle to a third duty cycle which is larger. For example, the duty cycle of the pulse width modulation signal is adjusted from 30% to 70%.

Therefore, in the present embodiment, when the duty cycle of the pulse width modulation signal PWMa is decreased, the average voltage of the pulse width modulation signal PWMa or the feedback voltage is decreased since the time duration when the pulse width modulation signal PWMa has the amplitude is smaller, and this in turn makes the feedback voltage Vfb of the second input terminal in1b decrease. In order to make the feedback voltage Vfb of the second input terminal increase to the reference voltage Vref, the regulator 104a increases the voltage Vout of the output terminal out1 and performs feedback of the voltage Vout to the second input terminal in1b through the feedback circuit 106a. That is, the feedback voltage Vfb of the second input terminal in1b is increased to the reference voltage Vref so as to compensate for the effect brought from the decreased average voltage of the pulse width modulation signal PWMa.

At the same time, since the regulator 104a increases the voltage Vout of the output terminal 104a to increase the feedback voltage Vfb, the voltage Vout of the output terminal out1 corresponding to the regulator 104a is slightly greater than voltages of output terminals corresponding to other regulators 104b-104d. Accordingly, when the duty cycle of the pulse width modulation signal PWMa is switched to the second duty cycle, the power is mainly outputted from the regulator 104a to the load 108. For example, in the present embodiment, a load current that flows through the load 108 is provided by the regulator 104a.

In some embodiments, ports of the control unit 102 for outputting the pulse width modulation signals PWMa-PWMd can be respectively coupled to terminals of a low-pass filter. The other terminals of the low-pass filters can be coupled to the second input terminals in1b of the regulators 104a-104d and the feedback circuits 106a-106d.

Identical to the power outputting principles mentioned above, when the duty cycles of the pulse width modulation signals PWMb-PWMd are switched from the first duty cycle to the second duty cycle, power is outputted from the corresponding regulators 104b-104d to the load 108.

Figure 2B:
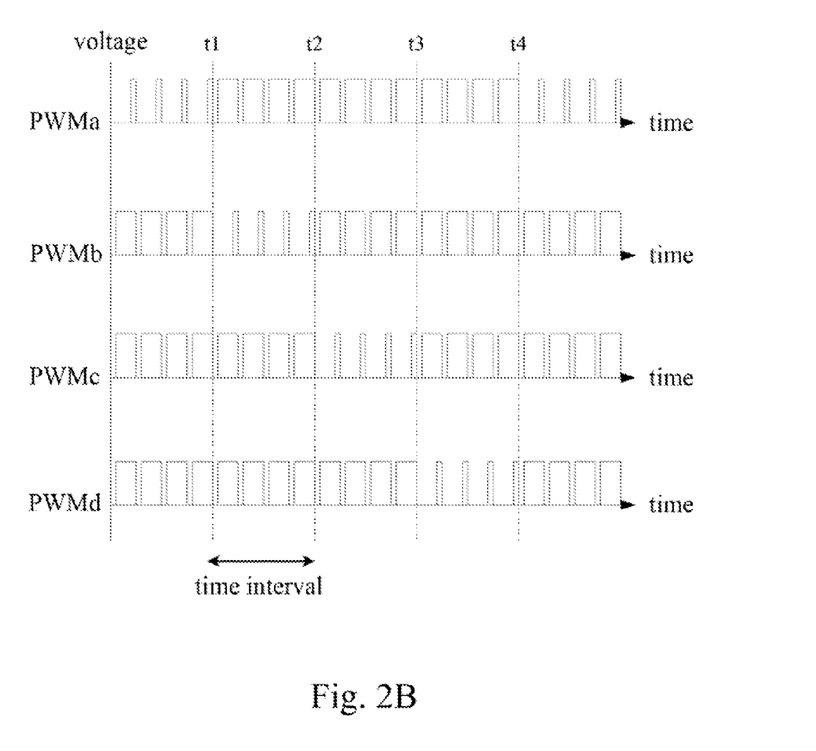
FIG. 2B is a timing diagram illustrating pulse width modulation signals generated by a control unit in FIG. 1.

Moreover, reference is also made to FIG. 2B for describing how the control unit 102 generates the pulse width modulation signals PWMa-PWMd so as to make the regulators 104a-104b output power one at a time and in rotation. FIG. 2B is a timing diagram illustrating the pulse width modulation signals PWMa-PWMd generated by the control unit 102 in FIG. 1. As shown in FIG. 2B, the power supply time period includes a plurality of time intervals (0-t1, t1-t2, t2-t3, t3-t4). The pulse width modulation signal generated in each time interval is preset to be equipped with a first duty cycle. The control unit 102 selects and sets one of the pulse width modulation signals as a second duty cycle in each time intervals. According to the power outputting principles described above, the regulator corresponding to the pulse width modulation signal with the second duty cycle outputs the output power so as to achieve time-division multiplexing power sharing and to decrease power consumption of each regulator. For example, compared to using a single regulator, if four regulators 104a-104d are used for outputting power one at a time and in rotation, each regulator 104a-104d consumes only a quarter of the power that it normally would.

In some embodiments, the control unit 102 may also adjust frequencies, duty cycles and amplitudes so as to overcome the characteristic deviation of the regulators.

Figure 3:
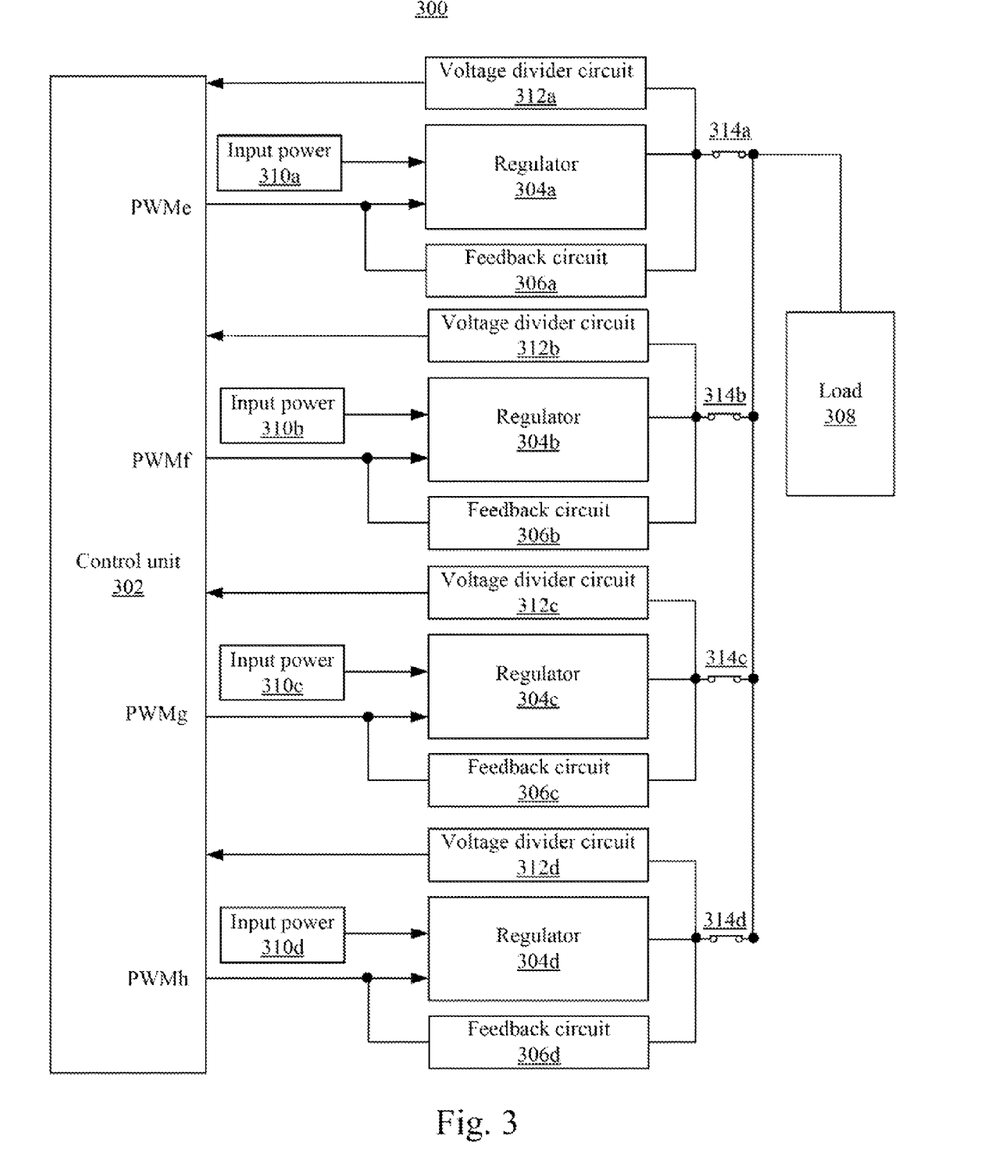
FIG. 3 is a schematic diagram illustrating a power sharing device according to another embodiment of this disclosure.

FIG. 3 is a schematic diagram illustrating a power sharing device 300 according to another embodiment of this disclosure. Connections and operations of a control unit 302, regulators 304a-304d, feedback circuits 306a-306d, a load 308 and input powers 310a-310d in the power sharing device 300 can be deduced by analogy to the elements (i.e., the control unit 102, regulators 104a-104d, feedback circuits 106a-106d, load 108 and input power 110a-110d) in the power sharing device 100 shown in FIG. 1. In addition, the inner structure and connecting relationships of the feedback circuits 306a-306d can be deduced by analogy to those of the feedback circuit 106a shown in FIG. 2A. The power sharing device 300 in this embodiment further includes voltage divider circuits 312a-312d and switches 314a-314d.

The voltage divider circuits 312a-312d are respectively coupled between output terminals of the regulators 304a-304d and the control unit 302. The voltage divider circuits 312a-312d are configured to divide the voltages of the output terminals corresponding to the regulators 304a-304d so as to make the control unit 302 periodically detect the voltage of the output terminal corresponding to each regulator 304a-304d. Next, the control unit 302 determines whether the regulators 304a-304d are valid and counts a valid number of the regulators 312a-312d. In some embodiments, the voltage divider circuits 312a-312d can be omitted, i.e., the output terminal of each regulator 304a-304d is electrically connected directly to the control unit 302.

The switches 314a-314d are coupled between the output terminals of the regulators 304a-304d and the load 308. When each power supply time period ends, the switches 314a-314d can make the control unit 302 detect the voltage of the output terminal corresponding to each regulator 304a-304d. In more detail, when the power supply time period ends, the switches 314a-314d are open (i.e., open circuit) so as to make the control unit 302 detect the voltage of the output terminal corresponding to each regulator 304a-304d. When the power supply time period starts, the switches 314a-314d are short (i.e., electrically connected to the output terminals of the regulators 304a-304d and the load 308) so as to make the regulators 304a-304d output the power to the load 308 one at a time and in rotation.

Figure 4A:
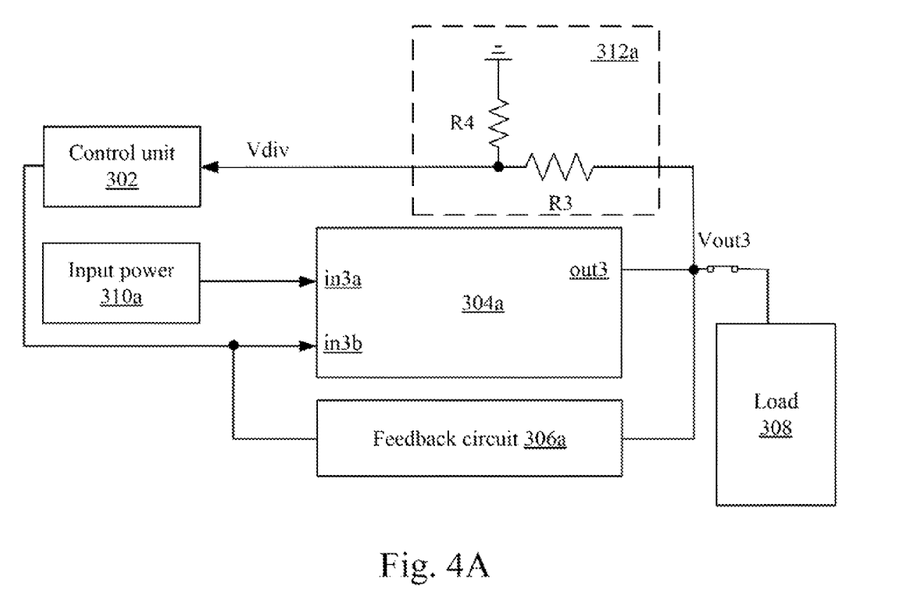
FIG. 4A is a schematic diagram illustrating a regulator and a feedback circuit in FIG. 3.

Reference is now made to FIG. 4A so as to illustrate the detailed structures and connecting relationships of the regulators 304a-304d and the voltage divider circuits 312a-312d. FIG. 4A is a schematic diagram illustrating the regulator 304a and the feedback circuit 312a in FIG. 3. The inner structures and the connecting relationships of the other regulators 304b-304d and voltage divider circuits 312b-312d are similar to those of the regulator 304a and voltage divider circuit 316a in FIG. 4A.

The regulator 304a includes a first input terminal in3a, a second input terminal in3b and an output terminal out3. The first input terminal in3a is coupled to the input power 310a. The second input terminal in3b is coupled to the control unit 302. The output terminal out3 is coupled to the load 308.

The voltage divider circuit 312a includes a resistor R3 and a resistor R4. A terminal of the resistor R3 is coupled to the output terminal out3 of the regulator 304a. The other terminal of the resistor R3 is coupled to the control unit 302 and a terminal of the resistor R4. The other terminal of the resistor R4 is coupled to ground.

The voltage divider circuit 312a is configured to divide the voltage Vout3 of the output terminal out3 corresponding to the regulator 304a so as to generate the divided voltage Vdiv and output the same to the control unit 302. Resistances of the resistor R3 and of the resistor R4 are determined according to a voltage range allowable for the input terminals of the control unit 302. For example, if the voltage Vout3 of the output power corresponding to the regulator 304a is 12V, and the maximum voltage allowable for the input terminals of the control unit is 1.2V, the resistance ratio of the resistor R3 and the resistor R4 can be set to be 11:1. Accordingly, the divided voltage Vdiv and the voltage of the input terminal corresponding to the control unit 302 are set to be 1V so as to make the control unit 302 periodically detect the voltage Vout3 of the output terminal out3 corresponding to the regulator 304a.

In operation, before the power supply time period begins, the control unit 302 determines whether the regulators 304a-304d are valid through the voltage divider circuits 312a-312d. In more detail, a threshold voltage and the divided voltage Vdiv generated by the voltage divider circuit 312a are compared to determine whether the regulator 304a is valid. If the divided voltage is greater than or equal to the threshold voltage, the regulator 304a is valid. If the divided voltage is less than the threshold voltage, the regulator 304a is invalid. Validness and invalidness affect the pulse width modulation signals PWMe-PWMh outputted by the control unit 302.

Figure 4B:
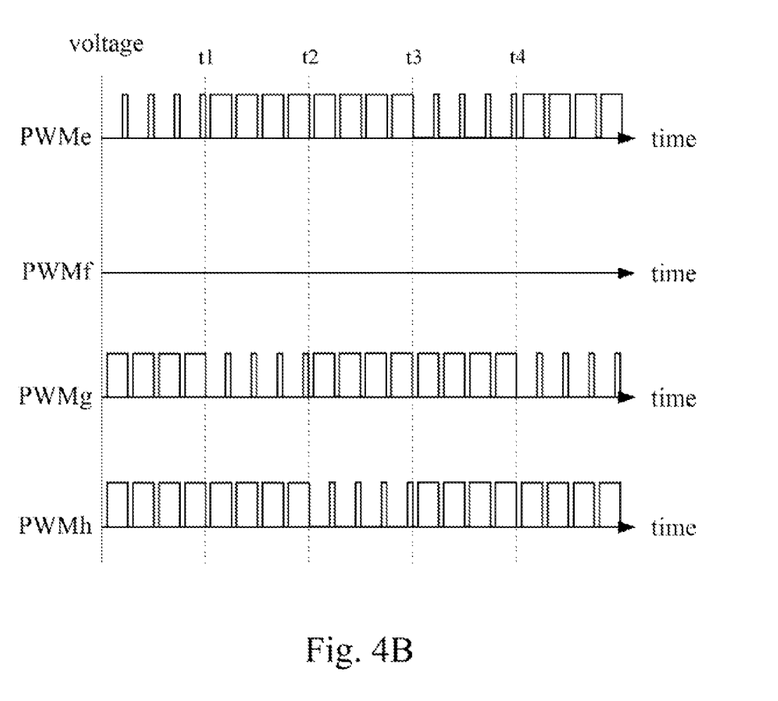
FIG. 4B is a timing diagram illustrating pulse width modulation signals generated by a control unit in FIG. 3.

Moreover, reference is now made to both FIG. 3 and FIG. 4B. FIG. 4B is a timing diagram illustrating pulse width modulation signals PWMe-PWMh generated by the control unit 302 in FIG. 3. If the regulator 304b is determined to be invalid before the power supply period, the control unit 302 does not output the pulse width modulation signal PWMf. Therefore, the control unit 302 outputs the pulse width modulation signals PWMe, PWMg and PWMh to the regulators 304a, 304c and 304d respectively so as to make the regulators 304a, 304c and 304d to output the power one at a time and in rotation.

In some embodiments, the control regulator 304b may break down or the input power 304b no longer provides the power.

In some embodiments, the control unit 302 keeps outputting the pulse width modulation signal PWMf, but the control unit 302 does not adjust the duty cycle of the pulse width modulation signal PWMf.

In some embodiments, if the control unit 302 determines the regulator 304b to be invalid through the voltage divider circuit 312b, the switch 314b keeps open, and the control unit 302 does not output or adjust the duty cycle of the pulse width modulation signal PWMf. Later before the next power supply time period, if the regulator 304b is determined to be valid, the switch 314b is short when the next power supply time period starts, and the duty cycle of the pulse width modulation signal PWMf starts to be adjusted so as to make the regulator 304b and the other valid regulators output the power one at a time and in rotation.

Figure 5:
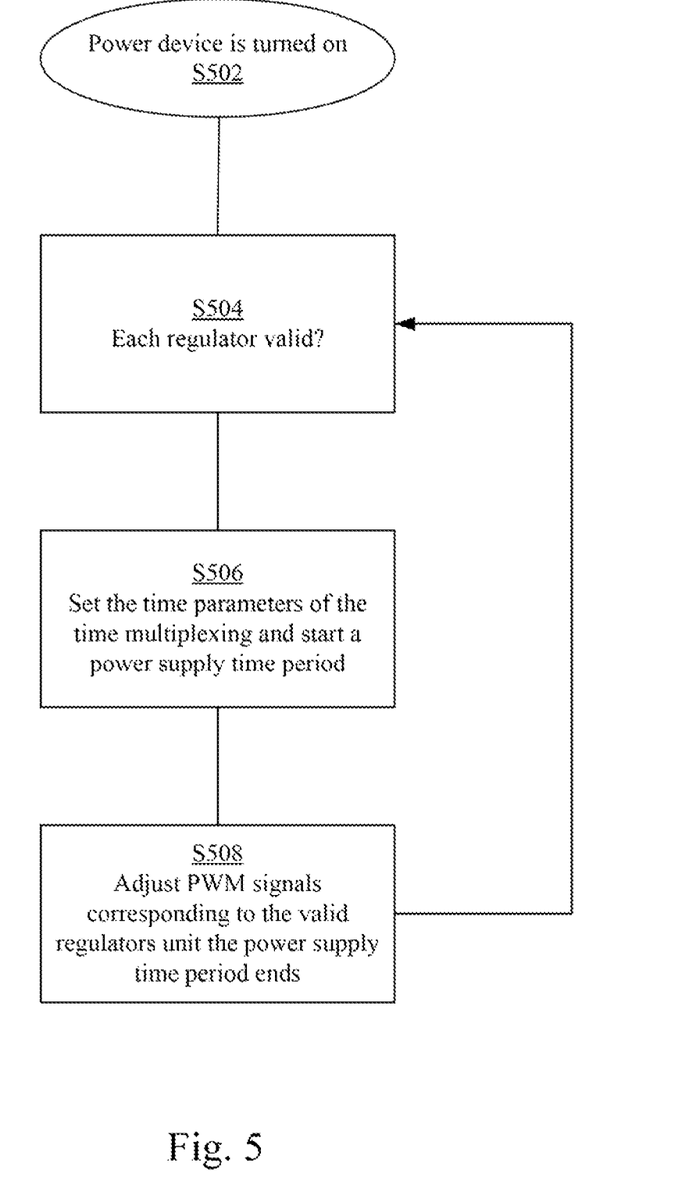
FIG. 5 is a flow diagram illustrating a power sharing method of the power sharing device in FIG. 3.

Moreover, reference is made to FIG. 5 to illustrate the complete flow of a power sharing method. FIG. 5 is a flow diagram illustrating the power sharing method of the power sharing device in FIG. 3. When the power sharing device 300 is turned on (step S502), each regulator 304a-304d is determined to be valid or not (step S504), and the valid number of the regulators 304a-304d is counted. Subsequently, the control unit 302 sets time parameters of the power supply time period and of the time intervals according to the valid number, and initializes a power supply time period (step S506). In the power supply time period, pulse width modulation signals are adjusted corresponding to the valid regulators one at a time and in rotation until the power supply time period ends (step S508). When the power supply time period ends, each regulator is again determined to be valid or not (step S504), and the next power supply time period starts (step S506).

In all the embodiments mentioned above of the present disclosure, the power supply period may be a fixed time length or a non-fixed time length.

In all the embodiments mentioned above of the present disclosure, a time duration for which each time interval lasts may be the power supply time period divided by the valid number, the power supply time period divided by the multiple of the valid number or a fixed time length.

Based on the aforesaid embodiments, not only can the hardware and software complexity of the power sharing device be reduced, but the flexibility in designing the number of the regulators can be enhanced. In addition, when some of the regulators among a plurality of regulators malfunction due to aging circuitry, the rest of the regulators can still achieve power sharing according to the present disclosure.

Although the disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power sharing device suitable for a plurality of input powers and a load, wherein the power sharing device comprises:
   a control unit generating multiple pulse width modulation signals;
   a plurality of regulators, wherein each of the plurality of regulators comprises:
      a first input terminal receiving one of the plurality of input powers;
      a second input terminal receiving one of the multiple pulse width modulation signals, in which a feedback voltage is generated on the second input terminal; and
      an output terminal selectively outputting an output power; and
   a plurality of feedback circuits, wherein each feedback circuit is coupled between the second input terminal and the output terminal of one of the plurality of regulators;

wherein the output terminal of each of the plurality of regulators is electrically connected to the load, and the plurality of regulators selectively output the output power to the load one at a time and in rotation according to the plurality of input powers and a duty cycle of each of the multiple pulse width modulation signals during a power supply time period.

2. The power sharing device of claim 1, wherein the duty cycle of each pulse width modulation signal is set to be a first duty cycle, the power supply time period comprises a plurality of time intervals, and the control unit is configured to adjust the duty cycle of one of the pulse width modulation signals to be a second duty cycle so as to change the feedback voltage of the corresponding regulator, this in turn making the corresponding regulator adjust the output power to compensate for the feedback voltage through the corresponding feedback circuit.

3. The power sharing device of claim 1, wherein the control unit is further coupled to the output terminal of each regulator, and the control unit periodically detects the output power of the output terminal of each regulator so as to determine whether the regulators are valid, and to count a valid number of the regulators.

4. The power sharing device of claim 1, further comprising a plurality of voltage divider circuits, wherein the voltage divider circuits are coupled respectively between the output terminals of the regulators and the control unit, and the control unit periodically detects the output power of each regulator so as to detect whether the regulators are valid and count a valid number of the regulators.

5. The power sharing device of claim 4, wherein each voltage divider circuit provides a divided voltage of one of the output powers to the control unit, the regulator corresponding to the divided voltage is determined to be a valid regulator when the divided voltage is greater than or equal to a threshold voltage, the regulator corresponding to the divided voltage is determined to be an invalid regulator when the divided voltage is less than a threshold voltage, and the control unit does not adjust or output the duty cycle of the pulse width modulation signal corresponding to an invalid regulator.

6. The power sharing device of claim 5, wherein the power supply time period comprises a plurality of time intervals, and a time duration for which each time interval lasts is the power supply time period divided by the valid number, the power supply time period divided by a multiple of the valid number or a fixed time length.

7. A power sharing method suitable for a plurality of input powers and a load, comprising:
   providing the plurality of input powers and a plurality of pulse width modulation signals generated by a control unit to a plurality of regulators, wherein the plurality of regulators receive the plurality of input powers and the plurality of pulse width modulation signals so as to generate a plurality of feedback voltages;
   generating a plurality of output powers respectively corresponding to the plurality of pulse width modulation signals according to the plurality of input powers by the plurality of regulators;
   adjusting duty cycles of the plurality of pulse width modulation signals by the control unit; and
   outputting the plurality of output powers one at a time and in rotation by the plurality of regulators in a power supply time period according to the adjusted duty cycles of the plurality of pulse width modulation signals.

8. The power sharing method of claim 7, wherein the power supply time period further comprises a plurality of time intervals, and the duty cycles of the pulse width modulation signals are set to be a first duty cycle;
   wherein the step of adjusting the duty cycles of the pulse width modulation signals comprises adjusting the duty cycle of one of the pulse width modulation signals to be a second duty cycle by the control unit so as to change the feedback voltage corresponding to one of the regulators;
   wherein the step of outputting the output power one at a time and in rotation comprises adjusting the output power corresponding to the one of the regulators so as to compensate for the feedback voltage of the one of the regulators through a feedback circuit.

9. The power sharing method of claim 7, wherein before the step of providing the input powers and the pulse width modulation signals, the power sharing method further comprises:
   detecting the output power of each regulator periodically by the control unit so as to determine whether each regulator is valid; and
   counting a valid number of the regulators by the control unit.

10. The power sharing method of claim 7, wherein before the step of providing the input powers and the pulse width modulation signals, the power sharing method further comprises:
   detecting a divided voltage of each output power corresponding to each regulator periodically by the control unit so as to determine whether each regulator is valid; and
   counting a valid number of the regulators by the control unit.

11. The power sharing method of claim 10, wherein the regulator corresponding to the divided voltage is determined to be a valid regulator when the divided voltage is greater than or equal to or equal to a threshold voltage, and the regulator corresponding to the divided voltage is determined to be an invalid regulator when the divided voltage is less than a threshold voltage.

12. The power sharing method of claim 11, wherein the duty cycle of the pulse width modulation signal corresponding to any one of the regulators is adjusted or outputted only when said regulator is determined to be a valid regulator.

13. The power sharing method of claim 10, wherein the power supply time period comprises a plurality of time intervals, and a time duration for which each time interval lasts is the power supply time period divided by the valid number, the power supply time period divided by a multiple of the valid number or a fixed time length.

* * * * *